United States Patent
Meier et al.

(10) Patent No.: US 7,950,147 B2
(45) Date of Patent: May 31, 2011

(54) METHOD FOR PRODUCING GAS TURBINE COMPONENTS

(75) Inventors: Reinhold Meier, Dorfen (DE); Erich Steinhardt, Munich (DE)

(73) Assignee: MTU Aero Engines GmbH, Munich (DE)

( * ) Notice: Subject to any disclaimer, the term of this patent is extended or adjusted under 35 U.S.C. 154(b) by 970 days.

(21) Appl. No.: 10/581,939

(22) PCT Filed: Nov. 24, 2004

(86) PCT No.: PCT/DE2004/002599
§ 371 (c)(1),
(2), (4) Date: Jun. 7, 2006

(87) PCT Pub. No.: WO2005/056220
PCT Pub. Date: Jun. 23, 2005

(65) Prior Publication Data
US 2007/0122606 A1    May 31, 2007

(30) Foreign Application Priority Data
Dec. 10, 2003  (DE) .................. 103 57 656

(51) Int. Cl.
*B21D 53/78* (2006.01)
*B21K 3/04* (2006.01)
*B23P 15/02* (2006.01)
*B23P 15/04* (2006.01)
*B22D 27/00* (2006.01)

(52) U.S. Cl. ............. 29/889.721; 29/889.72; 29/889.71; 164/79

(58) Field of Classification Search ............. 29/889.721, 29/889.722, 889.72, 889.71, 889.7; 164/79; 75/415
See application file for complete search history.

(56) References Cited

U.S. PATENT DOCUMENTS

| 2,917,384 A | 12/1959 | Grandey .................. 75/222 |
| 3,087,807 A | 4/1963 | Allen et al. .................. 75/20 |
| 5,393,485 A * | 2/1995 | Worz et al. .................. 419/41 |
| 5,511,949 A * | 4/1996 | Thore .................. 416/213 R |
| 5,900,207 A * | 5/1999 | Danforth et al. .................. 264/603 |
| 6,648,596 B1 * | 11/2003 | Grylls et al. .................. 415/200 |
| 6,827,556 B2 * | 12/2004 | Simon .................. 416/241 R |
| 2003/0115730 A1 | 6/2003 | Ament et al. .................. 29/17.3 |
| 2005/0205644 A1 | 9/2005 | Meier .................. 228/47.1 |

FOREIGN PATENT DOCUMENTS

| AT | 405 946 B | 12/1999 |
| DE | 40 18 360 C1 | 5/1991 |
| DE | 199 12 618 | 9/2000 |
| DE | 102 06 447 | 8/2003 |
| WO | WO 01/53023 | 7/2001 |
| WO | WO 03/015964 | 2/2003 |

* cited by examiner

*Primary Examiner* — David P Bryant
*Assistant Examiner* — Sarang Afzali
(74) *Attorney, Agent, or Firm* — Davidson, Davidson & Kappel, LLC

(57) ABSTRACT

A method for producing gas turbine components, in particular blades, blade sections or rotors with integral blades for a jet engine is provided. The method comprises at least the following steps: preparation of at least one metallic powder and at least one expanding agent; mixing of the metallic powder or each metallic powder with the expanding agent or each expanding agent; compression of the resultant mixture to form at least one semi-finished product; expansion of the semi-finished product or each semi-finished product by heating to achieve a defined degree of expansion; termination of the expansion process by cooling, once the defined degree of expansion has been reached.

14 Claims, 3 Drawing Sheets

METHOD FOR PRODUCING GAS TURBINE COMPONENTS

FIELD OF THE INVENTION

The present invention relates to a method for manufacturing gas turbine components.

BACKGROUND

Modern gas turbines, in particular aircraft engines, must meet the highest demands with regard to reliability, weight, performance, cost-effectiveness, and service life. In particular in civil aviation, aircraft engines have been developed over the previous decades which fully meet the above-mentioned requirements and have reached a high degree of technological perfection. Among other things, material selection, the search for new, suitable materials, and the search for new manufacturing methods play a decisive role in the development of aircraft engines.

The most important materials used today for aircraft engines or other gas turbines are titanium alloys, nickel alloys (also known as super alloys), and high-strength steels. High-strength steels are used for shaft components, gear components, compressor housings, and turbine housings. Titanium alloys are typical materials for compressor components. Nickel alloys are suitable for the hot components of the aircraft engine.

Precision casting and forging are primarily known from the related art as manufacturing methods for gas turbine components made of titanium alloys, nickel alloys, or other alloys. All highly stressed gas turbine components such as blades for a compressor are forged components. In contrast, rotating blades and guide blades of the turbine are as a rule designed as precision cast components.

For reducing the weight of gas turbine components it is known from the related art to use metal matrix composite materials (known as MMC materials). High-strength fibers are embedded in the metal material of such MMC materials. However, the manufacture of gas turbine components using such MMC materials is expensive. Moreover, rotating blades of a gas turbine rotor, for example, cannot be manufactured using such MMC materials, since rotating blades made of MMC materials have only limited strength vis-à-vis bird strike, for example.

Another approach for reducing weight known from the related art is to design gas turbine components as hollow components. Blades are already manufactured as hollow blades with the aid of diffusion welding. However, such diffusion-welded hollow blades are expensive.

SUMMARY OF THE INVENTION

Since blades made of MMC materials have insufficient strength vis-à-vis bird strike, for example, and hollow blades are too expensive, an object of the present invention is to propose alternative options for reducing weight. The mass of guide blades and rotating blades contributes considerably to the total weight of a gas turbine, in particular an aircraft engine. If the weight of the rotating blades can be reduced, then the rotor can also have a lighter design since the rotor has to absorb lower centrifugal forces when the weight of the rotating blades is reduced. The lighter an aircraft engine can be designed, the more favorable is the thrust to weight ratio of the aircraft engine which in turn represents a decisive competitive criterion for aircraft engines.

On this basis, an object of the present invention is to propose a novel method for manufacturing gas turbine components.

The method according to the present invention for manufacturing gas turbine components, in particular blades, blade segments, or rotors having integral blades for an aircraft engine includes at least the following steps: providing at least one metal powder and at least one foaming agent; mixing the metal powder or each metal powder with the foaming agent or each foaming agent; compacting the resulting mixture to form at least one precursor; foaming the precursor or each precursor by heating up to a defined degree of foaming; terminating the foaming process by cooling when the defined degree of foaming is reached.

According to the present invention, a method to design gas turbine components, in particular guide blades and rotating blades for a compressor or a turbine of an aircraft engine, using metal foam at least partially is provided. Use of metal foams represents a cost-effective alternative compared to hollow blades, a clear weight reduction being implementable due to the porosity of the metal foam.

According to an advantageous refinement of the present invention, the precursor is foamed in a mold, the mold being actively heated and actively cooled during the foaming process in order to obtain a gas turbine component having a closed and supporting exterior wall of a defined wall thickness.

The method according to the present invention is preferably used for manufacturing a blade, in particular a compressor blade or a turbine blade for an aircraft engine, the respective precursor being foamed in a mold, and at least one supporting and/or function-relevant component made of a non-foamable material being at least partially surrounded by foam or embedded in foam during the foaming process of the precursor. The supporting and/or function-relevant component may be, for example, a blade root made of a non-foamable material which is partially embedded in foam or surrounded by foam. For manufacturing an integrally bladed rotor, for example, multiple blades manufactured in this way may be fixedly joined with a forged or cast rotor carrier via a joining process, in particular via soldering or welding.

BRIEF DESCRIPTION OF THE DRAWINGS

Exemplary embodiments of the present invention, without being limited thereto, are explained in greater detail on the basis of the drawing.

DETAILED DESCRIPTION

The present invention is subsequently explained in greater detail with reference to FIGS. 1 through 6, FIGS. 2 through 6 each showing a cross section of rotating blades of a gas turbine, i.e., an aircraft engine, which are manufactured using the method according to the present invention.

The approach of the method according to the present invention for manufacturing a guide blade or a rotating blade or for manufacturing a guide blade segment or a rotating blade segment for an aircraft engine is that in a first step 10 of the method a metal powder is provided and in a second step 11 a foaming agent is provided. The provided metal powder is preferably a metal powder on the basis of an aluminum alloy, or a titanium alloy, or a nickel alloy. It is also possible to use a metal powder on the basis of a cobalt alloy or an iron alloy. Furthermore, metal powders made of intermetallic titanium-aluminum alloys may be used. Titanium hydride in particular is provided as the foaming agent.

The provided metal powder and the provided foaming agent are mixed in a step 12. The mixture of metal powder and foaming agent resulting from the mixing process is subsequently compacted to form a precursor. Compacting may be carried out either according to step 13 by extrusion or according to step 14 by axial hot pressing. At the end of the compacting process according to step 13 or step 14 there is a precursor which is indicated in the flow diagram of FIG. 1 by step 15. The precursor is externally virtually indistinguishable from a conventional metal; however, it contains the foaming agent and is therefore foamable.

For manufacturing the gas turbine component, the precursor present in step 15 is heated according to step 16 in particular to just above its melting point so that the metal is melted and gas is released from the foaming agent. Foaming of the precursor is triggered by the gas release from the foaming agent. The foaming process is carried out until a defined degree of foaming is reached. As soon as the defined degree of foaming is reached, the foaming process is terminated in such a way that cooling below the melting point of the used metal powder is carried out. The foaming process triggered by heating the precursor above the melting point of the metal powder and the corresponding termination of the foaming process by cooling below the melting point of the metal powder are both indicated by step 16.

Subsequent to step 16, surface machining or other processing or surface finishing of the manufactured gas turbine component may be carried out according to step 17. This, however, is optional.

Figure 1:
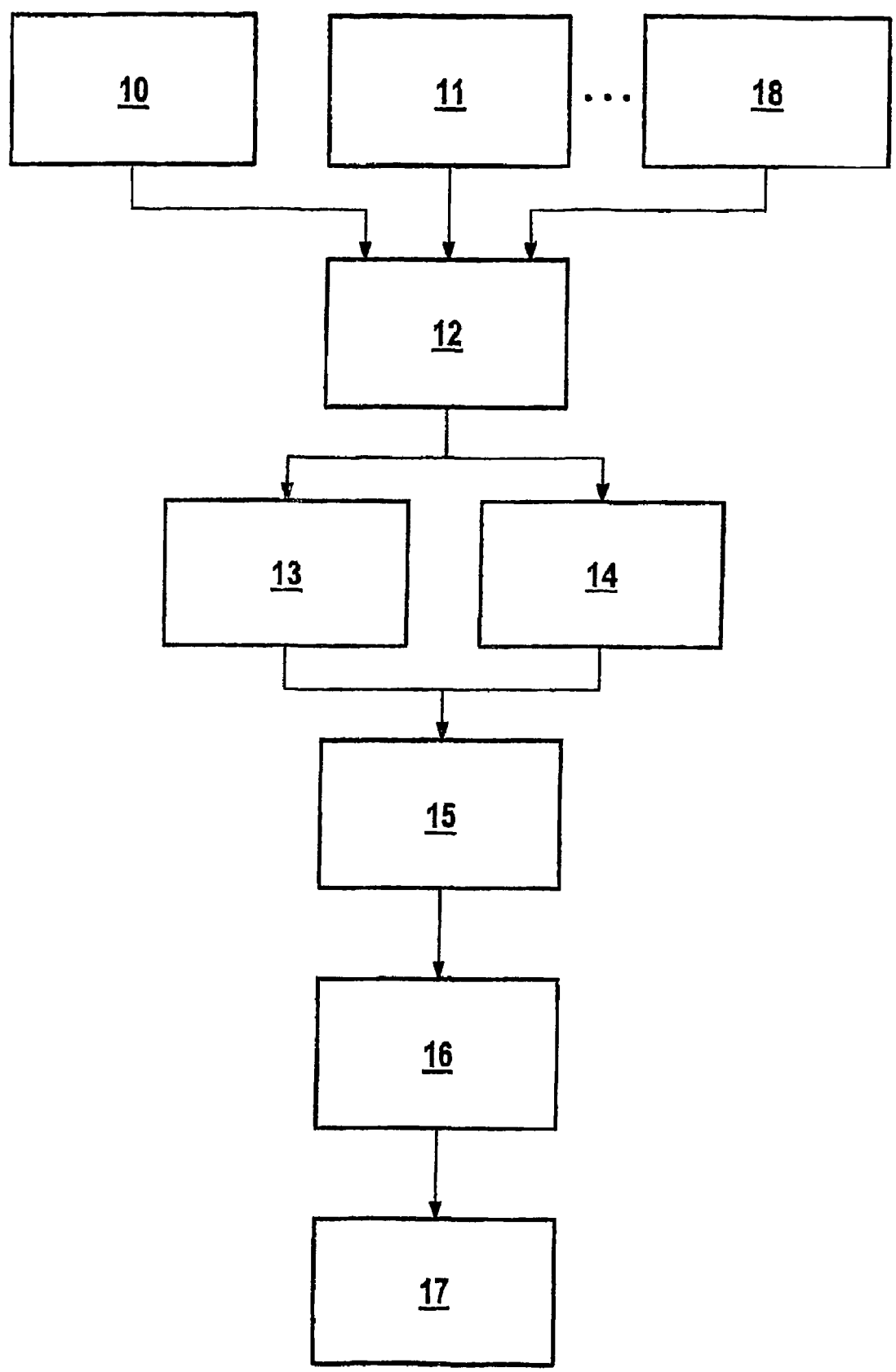
FIG. 1 shows a block diagram for elucidating the method according to the present invention for manufacturing gas turbine components.

Furthermore, FIG. 1 shows, according to a step 18, that in addition to the metal powder provided according to step 10 and the foaming agent provided according to step 11 other elements may be mixed with the metal powder and the foaming agent in step 12. The other elements may be, for example, an additional metal powder having a different melting point or different powder granularity, a different foaming agent, or also ceramic particles, ceramic fibers, or other inorganic or organic elements.

Under consideration of the preferred manufacture of blades for aircraft engines, some of the method steps roughly mentioned above are subsequently discussed in greater detail. This is essentially step 16 relating to foaming the precursor.

Figure 2:
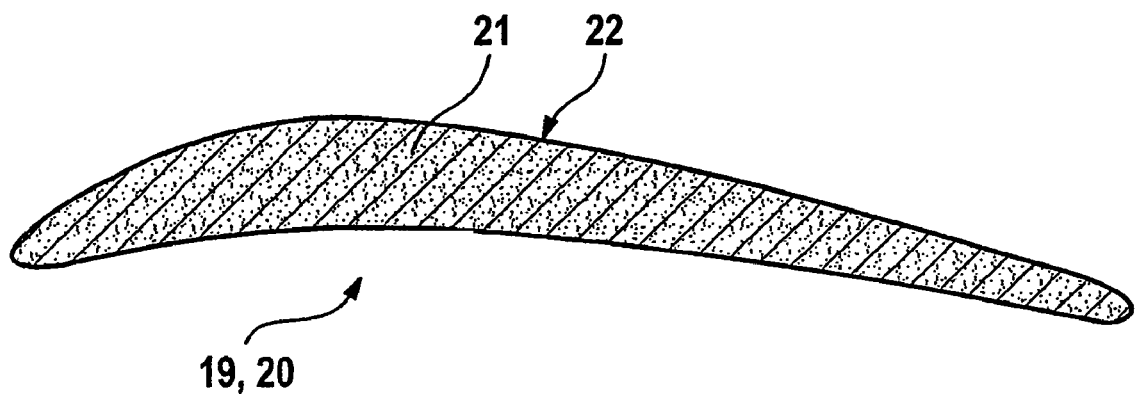
FIG. 2 shows a cross section of a blade of a gas turbine according to the present invention in a first exemplary embodiment of the present invention.

FIG. 2 shows a cross section through a blade 19 of an aircraft engine designed according to the present invention, i.e., through a vane 20 of the blade. According to FIG. 2 and according to the present invention, blade 19 is made of metal foam, at least partially; in the exemplary embodiment in FIG. 2, an inner core 21 of blade 19 has a porous design and an exterior wall 22 of the blade has a closed design. For manufacturing such a blade 19 having a porous core 21 and a closed and supporting exterior wall 22, a corresponding, foamable precursor is foamed in a mold during step 16. The mold is an actively heatable and actively coolable mold. Heating devices and cooling devices are thus assigned to the mold, the heating devices and cooling devices being activatable by a control device; the temperature of the mold may follow a predefined temperature profile with the aid of the heating and cooling devices. The mold is a hollow mold made of sheet steel, for example, the precursor to be foamed filling the mold completely after the foaming process. The mold is removed after the foaming process. In this way, the closed and supporting exterior wall 22 may be obtained.

Figure 3:
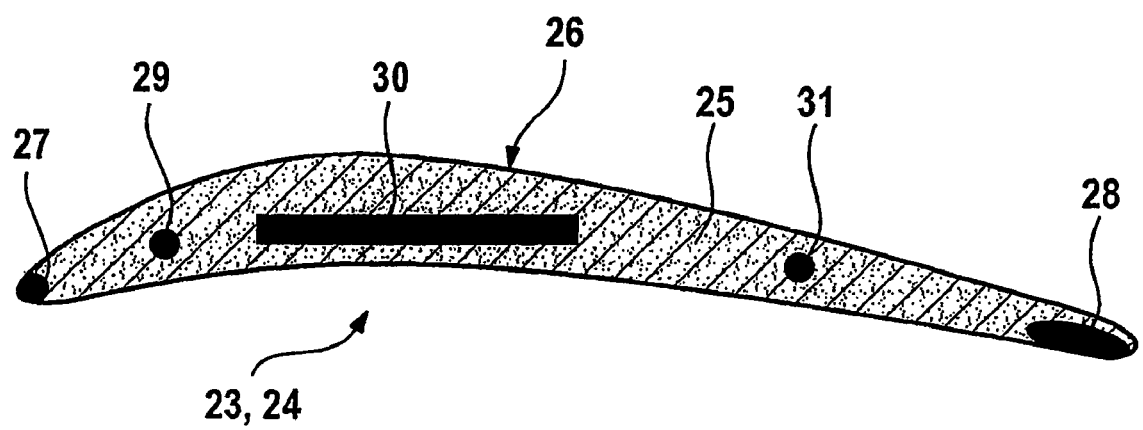
FIG. 3 shows a cross section of a blade of a gas turbine according to the present invention in a second exemplary embodiment of the present invention.

FIG. 3 shows a blade 23, i.e., a cross section through a vane 24 of blade 23 according to a second exemplary embodiment of the present invention. In the exemplary embodiment in FIG. 3, blade 23 is also made of metal foam, at least partially, blade 23 having a porous core 25 as well as a closed and supporting exterior wall 26. According to FIG. 3, supporting or function-relevant components made of a non-foamable material are integrated into core 25 of blade 23; these components, according to step 16, are partly or completely surrounded by foam or embedded in foam during the foaming process. In the exemplary embodiment in FIG. 3, a total of five such supporting or function-relevant components are at least partially foamed into core 25, i.e., a component 27 in the area of a flow inlet edge of blade 23, a component 28 in the area of a flow outlet edge of blade 23, and another three components 29, 30, and 31 in the interior of vane 24. Components 27 through 31 foamed into vane 24 may either be made of the same material as the metal foam or may be made of another material. It is thus possible, that when a metal foam on the basis of a titanium alloy is used, the other components 27 through 31 are also made of a titanium alloy. However, it is also possible that components 27 through 31 are components made of another metal alloy or components made of a ceramic material. When individual blades are produced, which are mounted on a rotor via a blade root, it is preferred according to the present invention, during the foaming process according to step 16, to foam a blade root made of a non-foamable material into the precursor during foaming of same.

Figure 4:
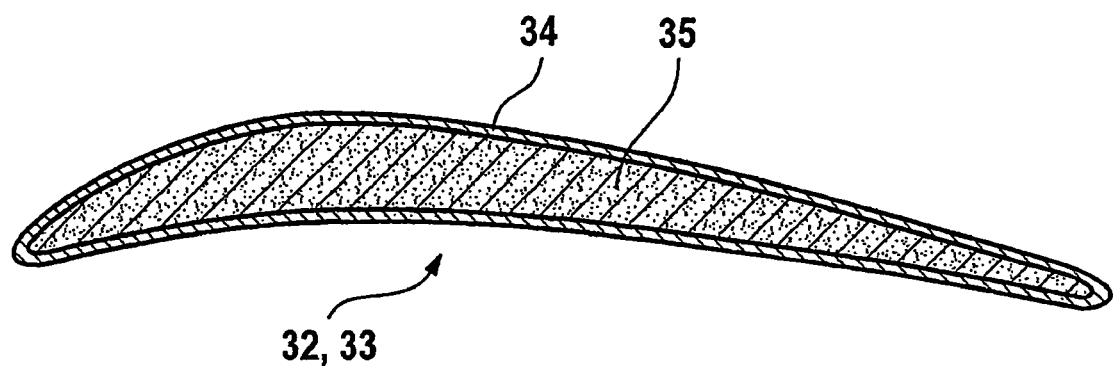
FIG. 4 shows a cross section of a blade of a gas turbine according to the present invention in a third exemplary embodiment of the present invention.

Furthermore, it is the object of the present invention to manufacture a blade for an aircraft engine in such a way that a hollow body, which is formed by a fiber-reinforced metal or a fiber-reinforced plastic or from an intermetallic alloy, is filled with a metal foam during step 16 and the metal foam and the hollow body are subsequently melted together to form a firmly bonded composite. FIG. 4 shows a blade 32, i.e., a vane 33 of same, the blade being formed from a metallic hollow body 34, the metallic hollow body being filled by a core 35 made of metal foam, and core 35 is joined firmly bonded with hollow body 34. Hollow body 34 in FIG. 3 is a hollow body having a one-piece design. The exterior geometry of blade 32 is determined by the exterior geometry of hollow body 34.

Figure 5:
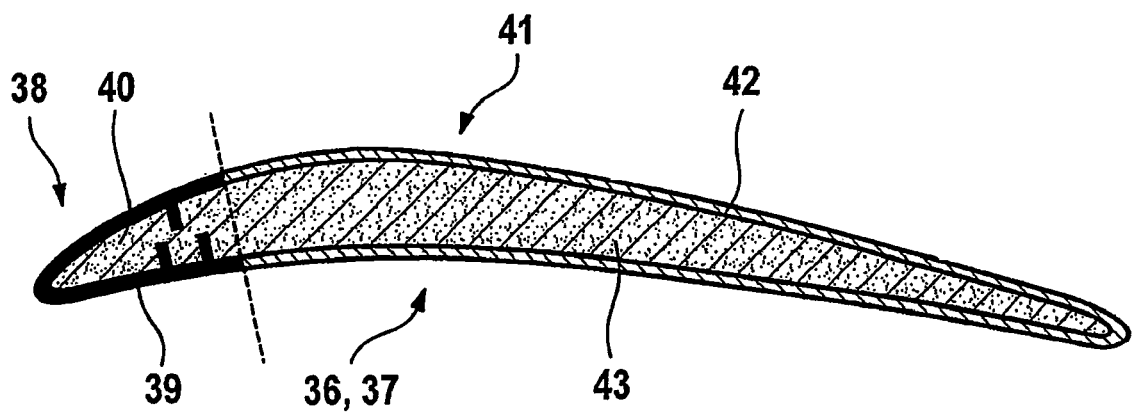
FIG. 5 shows a cross section of a blade of a gas turbine according to the present invention in another exemplary embodiment of the present invention.

FIG. 5 shows another exemplary embodiment of a blade 36 manufactured according to the present invention, i.e., a cross section through a vane 37 of same. In the exemplary embodiment in FIG. 5, a first part 38 of blade 36, which forms the flow inlet side of blade 36, is manufactured by filling a hollow body 39 with a core 40 made of metal foam, core 40 made of metal foam being form-fittingly connected to hollow body 39. As in the exemplary embodiment in FIG. 4, a second part 41 of blade 36 is manufactured by filling a hollow body 42 with a core 43 made of metal foam, core 43 being firmly bonded with hollow body 42. In blade 36 having such a two-part design, both hollow bodies 39 and 42 have preferably a different material composition, as do cores 40 and 43. Cores 40 and 43 may not only be made of a different metal alloy, but they also may have a different porosity. Both parts 38 and 41 of blade 36 may be connected by a joining process, e.g., via welding or soldering.

Many additional alternatives are possible within the scope of the present invention. It is the object of the present invention to mix metal powders having different melting points with the foaming agent in order to ensure a locally variable rigidity or strength of the blades. Moreover, it is the object of the present invention to use metal powders having different powder granularities in order to influence the porosity of the resulting metal foam in a targeted manner. Furthermore, ceramic powders or also ceramic fibers may be mixed with a metal powder and the foaming agent and subsequently compacted to form a foamable precursor. This makes it also possible to influence the stability of the metal foam or the component to be formed in a targeted manner.

Figure 6:
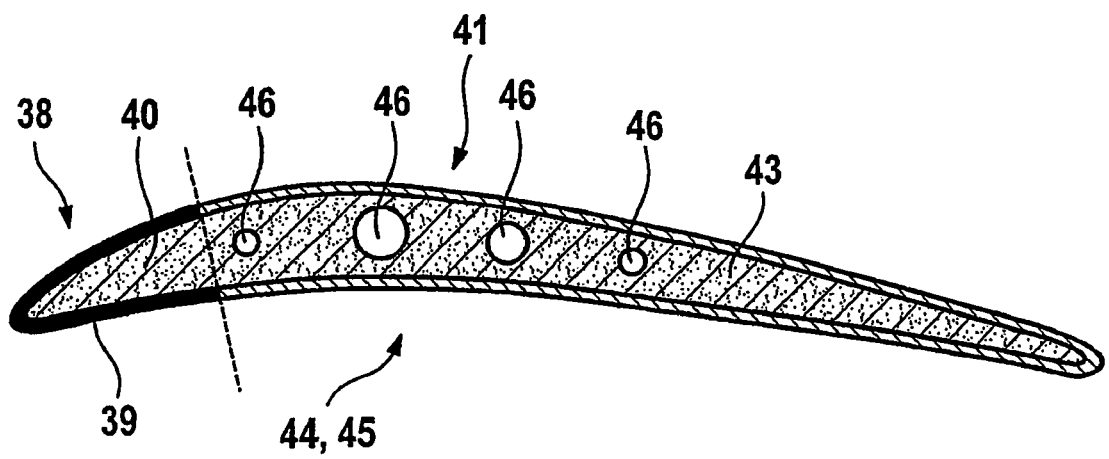
FIG. 6 shows a cross section of a blade of a gas turbine according to the present invention in another exemplary embodiment of the present invention.

FIG. 6 shows another exemplary embodiment of a blade 44 manufactured according to the present invention, i.e., a cross section through a vane 45 of blade 44. The exemplary embodiment in FIG. 6 is in essence identical to the exemplary embodiment in FIG. 5. The same reference numerals are used for the same components in order to avoid unnecessary repeats. The exemplary embodiment in FIG. 6 differs from the exemplary embodiment in FIG. 5 by the fact that function-relevant components 46 are integrated into core 43 of second part 41 of blade 44 by surrounding same by foam. The function-relevant components 46 are hollow bodies which are used as flow channels for the controlled removal by blowing or suction of a flow medium from the main flow channel of the gas turbine. Using the present invention, blades having integrated flow channels are thus manufacturable in a simple manner.

Different exemplary embodiments of blades designed according to the present invention have been described in connection with FIGS. 2 through 6. According to the present invention, blade segments made up of multiple individual blades as well as rotors having integral blades are also manufacturable, of course. Rotors having integral blades may be manufactured, for example, by mounting individual blades according to the exemplary embodiments in FIGS. 2 through 6 on forged or cast disc-shaped or ring-shaped rotor carriers via blade feet which are appropriately partially foamed into the blades. The blades on the rotor carrier may be mounted via soldering or welding or other joining processes. It should be pointed out again that, according to the present invention, individual blades as well as blade segments for rotors having integral blades may be manufactured entirely or partially using metal foam. The blades may be guide blades or rotating blades and the blade segments may be guide blade segments or rotating blade segments for a compressor or a turbine of an aircraft engine. Moreover, flow ribs or blades for fans may be manufactured according to the present invention.

As mentioned above, a gas turbine component manufactured according to the present invention may be subjected to subsequent processing or finishing as described in step 17. For example, the surfaces of blades may be coated with an oxidation protection layer or a corrosion protection layer during step 17 according to the present invention. Moreover, the manufactured components may be subjected to post-forging. Furthermore, covering the components manufactured using foaming technology with sheet metal, fiber-reinforced layers, or foils made of fiber-reinforced metal is possible.

According to the present invention, it is thus proposed to manufacture reduced-weight blades, blade segments, or rotors having integral blades by at least partially making the blades or blade segments of metal foam. The present invention provides a cost-effective alternative to the manufacture of diffusion-welded hollow blades. Blades, blade segments, or rotors having integral blades made of metal foam are, moreover, more impact-tolerant than similar gas turbine components made of MMC materials.

What is claimed is:

1. A method for manufacturing gas turbine components, comprising:

providing at least one metal powder and at least one foaming agent;

mixing the at least one metal powder with the at least one foaming agent, compacting the resulting mixture to form at least one precursor; and foaming the at least one precursor by heating the at least one precursor in a mold until a defined degree of foaming is reached;

cooling the at least one precursor when the defined degree of foaming is reached to terminate the foaming, the cooled at least one precursor being at least one gas turbine component having a closed and supporting exterior wall.

2. The method as recited in claim 1, wherein at least one supporting and/or function-relevant component made of a non-foamable material is at least partially surrounded by foam or partially embedded in foam during the foaming step.

3. The method as recited in claim 2, wherein the at least one precursor to be foamed and the component to be partially surrounded by foam or partially embedded in foam are made of the same material.

4. The method as recited in claim 2, wherein the at least one precursor to be foamed and the component to be partially surrounded by foam or partially embedded in foam are made of different materials.

5. The method as recited in claim 2, wherein the at least one gas turbine component is a blade, and wherein when the at least one precursor is foamed in the mold, a blade root made of a non-foamable material is partially surrounded by foam or partially embedded in foam during the foaming step.

6. The method as recited in claim 2, wherein the at least one gas turbine component includes a blade, and wherein the at least one precursor is foamed in a mold with at least one integrated flow channel, at least one component forming the flow channel being surrounded by foam during the foaming process.

7. The method as recited in claim 1, wherein the at least one metal powder is selected from the group consisting of an aluminum-based alloy, a titanium-based alloy, a nickel-based alloy, an intermetallic alloy and combination thereof.

8. The method as recited in claim 1, wherein the at least one foaming agent comprises titanium hydride.

9. The method as recited in claim 1, wherein the compacting step comprises compacting by extrusion or axial pressing.

10. The method as recited in claim 1, wherein the at least one metal powder includes a plurality of metal powders, each of the plurality of metal powders having different melting points.

11. The method as recited in claim 1, wherein the at least one metal powder includes a plurality of metal powders, each of the plurality of metal powders having different powder granularities.

12. The method as recited in claim 1, wherein said mixing comprises mixing the at least one metal powder with the at least one foaming agent and with a material selected from the group consisting of ceramic particles, ceramic fibers and combinations thereof.

13. The method as recited in claim 1, wherein the at least one gas turbine component includes a plurality of individual blades or blade segments formed from a corresponding plurality of precursors, and wherein the method further comprises
    fixedly joining the plurality of individual blades or blade segments with a forged or cast rotor carrier via soldering or welding.

14. The method as recited in claim 1, further comprising, subsequent to the cooling step, coating a surface of the at least one gas turbine component.

* * * * *